June 21, 1966 M. A. LAW 3,257,259
METHOD OF MAKING NON-WOVEN FABRICS
Filed June 9, 1965 4 Sheets-Sheet 1

INVENTOR:
MARVIN A. LAW

BY Parrott, Bell, Seltzer, Park + Heard
ATTORNEYS

June 21, 1966  M. A. LAW  3,257,259
METHOD OF MAKING NON-WOVEN FABRICS
Filed June 9, 1965  4 Sheets-Sheet 3

INVENTOR:
MARVIN A. LAW

BY Parrott, Bell, Seltzer, Park & Heard
ATTORNEYS

United States Patent Office 3,257,259
Patented June 21, 1966

3,257,259
METHOD OF MAKING NON-WOVEN FABRICS
Marvin A. Law, Spray, N.C., assignor to Fieldcrest Mills, Inc., Spray, N.C., a corporation of Delaware
Filed June 9, 1965, Ser. No. 462,584
23 Claims. (Cl. 161—55)

This invention relates to a novel non-woven fabric, particularly suited to the manufacture of blankets, and to the method of making the same, and is a continuation-in-part of my copending application Serial No. 354,685, filed March 25, 1964 and entitled Non-Woven Fabric and Method, now abandoned.

For many years blankets for bed-clothing have been manufactured by napping woven cloth. The weaving of cloth for blankets is necessarily a time-consuming and expensive process, especially when taking into consideration the many processes involved in manufacturing and preparing yarn for weaving. Recently, blankets have been manufactured by a tufting process. However, in order to produce a blanket of the required stability, texture, strength and pliability, it has still been necessary heretofore to weave a core for the tufted blankets, whereupon threads were looped over both surfaces of the core cloth before napping the composite fabric thus formed. Also, blankets have been made by needling webs or batts of fibers onto a woven core.

It is an object of this invention to provide a novel non-woven blanket fabric and method of making the same, in which carded textile webs are so formed and laminated as to provide fabric having the strength, stability and durability necessary for blankets without relying on the use of adhesive bonding agents and which fabric has the softness, pliability and texture of high quality woven blankets.

The art of manufacturing composite webs or batts of textile fibers by a needling process is well known in the production of felt textile articles, such as apparel, air filters and other articles in which a stiffness or "boardiness" of the finished article may not be objectionable. The webs of the prior art types of composite laminated web structures have been united by impregnation thereof with an adhesive or heat-settable bonding agent, by needle punching and/or by the heat-setting of thermoplastic fibers as well as by various other methods.

Although many attempts have been made heretofore to manufacture a composite laminated web structure from carded webs which could be used for producing blankets and other articles having the essential characteristics of texture, quality, stability, light weight, washability, strength, softness and pliability required in blankets, such attempts have been unsatisfactory, to my knowledge, unless the carded webs were laminated and united with a loosely woven cloth core or "scrim" by a needling process.

A composite web structure devoid of a scrim and suited to the manufacture of blankets has not been produced heretofore because (a) bonding agents and/or needled heat-set thermoplastic fibers, when relied on for uniting a thin composite web structure of the desired light weight and stability, would cause the web structure to be so boardy as to be unsuitable for a blanket material, (b) if layers of a thin, lightweight composite web were united solely by needling the number of needle punches per square inch necessary to effect the desired stability in the composite web would have to be so great that the composite web would be too boardy and of too uneven a texture to be used for a blanket material, and (c) if the effective number of needle punches were reduced in forming the latter type of composite web, the thickness and weight of the composite web would have to be increased to such extent in order to effect the desired stability that the composite web would be too heavy and thick for use as a blanket material. Also, the increased thickness of the composite web increases the boardiness thereof.

It is therefore a more specific object of this invention to provide a dimensionally stable composite laminated textile web structure or core and method of making the same wherein groups of thin carded sheets of substantially parallelized long staple textile fibers are arranged in superposed relationship to form two or more individual composite webs or core components therefrom with the composite webs being arranged also in superposed relationship. The fibers in each composite web extend substantially transversely of the fibers in the next adjacent composite web or webs, and the composite webs are united effectively by relying solely or mainly on "needlings." In other words, I rely solely or mainly on upsetting or diverting some of the fibers of each composite web out of their normal planes so they project into or through the next adjacent web to unite effectively the composite webs of the core.

As is known, needlings are formed by barbed needles of a needle loom penetrating and then withdrawing from the web or webs of textile material. All the carded sheets in each individual composite web forming the core must extend very nearly parallel in the carded direction; i.e., with respect to the direction in which they were advanced through the carding machine, and the long-fiber carded sheets in each composite web of the core must extend within 17° of right-angular relation to the immediately adjacent composite web with the number of needlings per given area being sufficient to bind the webs together without effecting objectionable boardiness or rigidity in the web structure. The weight of each carded sheet is in the range of from 0.20 to 1.6 ounces per square yard and the total weight of the web structure or core should not exceed 9.0 ounces per square yard. The fibers in the core have an average staple length of from 2½ inches to 6 inches.

It is another object of this invention to provide a non-woven fabric in which a face web of short staple nappable fibers of from ¾-inch to 2¼-inch average staple length is applied, in the form of thin carded sheets or a loose mass, to either or both faces of a composite core of the type heretofore described.

Each face web weighs at least 1.5 ounces per square yard and the aggregate weight of the core and the face web or face webs should be within the range of 6 to 13 ounces per square yard. Each face web is united with the core by sufficient fibers being upset or diverted and projected into the adjacent contiguous web of the core and/or from the core into each face web to bind the face web or face webs to the core without increasing the stiffness of the fabric beyond that of conventional woven cloth of substantially corresponding weight per square yard made from the same type of fibers.

It is another object of this invention to provide a non-woven fabric of the type described in which each face web is formed of a plurality of carded sheets of randomly arranged nappable textile fibers in which each sheets has a weight per square yard of rom 0.25 to 0.65 ounce. All the carded sheets in each face web are positioned in superposed substantially parallel carded relationship and are preferably positioned against the corresponding face of the core in substantially right-angular relation to the longitudinal axis of the core regardless of whether or not the adjacent contiguous web of the core also extends in substantially right-angular relation to the longitudinal axis of the core, since the core already has the required stability and strength before the face web or webs are united therewith.

Such short staple face webs are united with the core solely for the purpose of napping the fabric. Therefore, the thickness of each face web preferably corresponds substantially to the maximum depth that the fabric will be napped so the napped fabric will be of maximum strength while being of the desired weight and so that the long fibers in the core will not be disturbed or napped during the napping process.

Some of the objects of the invention having been stated, other objects will appear as the description proceeds, when taken in connection with the accompanying drawings, in which.

Figure 9:
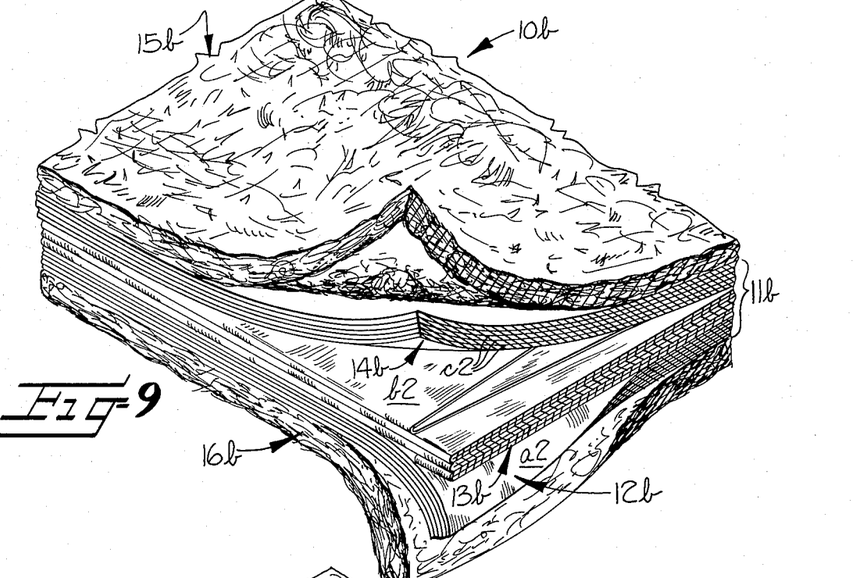
FIGURE 9 is a view similar to FIGURE 1 showing a third embodiment of the fabric in which relatively short face fibers are air-laid or otherwise applied in a loose random manner to each side of the core and then needled thereto.
Figure 10:
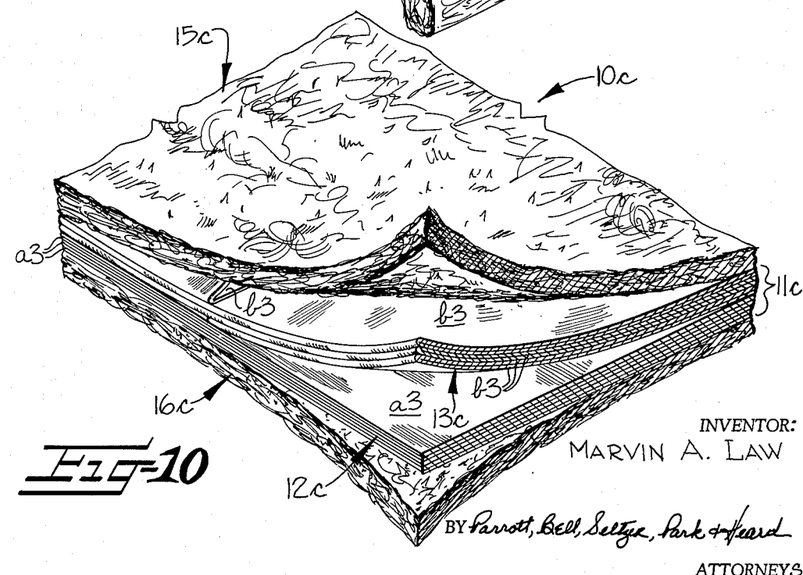
FIGURE 10 is a view similar to FIGURE 2 showing a fourth embodiment of the fabric in which relatively short face fibers are arranged in the manner of FIGURE 9.

Generally, the present invention comprises a novel method of making a non-woven fabric, and the resulting fabric, which has the texture, drape and pliability of woven fabrics suitable for blankets and certain articles of apparel. One embodiment of a non-woven fabric typical of many different fabrics which may be constructed according to the present invention, is broadly designated at 10 in FIGURE 1. Second, third and fourth embodiments of the novel non-woven fabric are shown in FIGURES 2, 9 and 10, respectively, broadly designated at 10a, 10b, 10c.

The fabrics 10a-10c include respective cores 11, 11a, 11b, 11c and respective front and back face webs or web-like components 15, 16; 15a, 16a; 15b, 16b and 15c, 16c. The cores only 11b, 11c of fabrics 10b, 10c and the entirety of fabrics 10, 10a are constructed from composite laminated webs or groups of thin, veil-like sheets of carded textile fibers of particular types to be later explained. The fibers in the various carded sheets may be stock dyed, if desired, before they are carded and formed into such sheets. Face webs 15b, 16b, 15c, 16c are each in the form of loosely applied incoherent masses of directionally random fibers which may be applied to the cores 11b, 11c by conventional air-laying equipment, for example.

All the carded sheets in alternate laminated webs, at least in the cores 11, 11a, 11b, 11c, extend longitudinally of the finished fabric and all the intervening carded sheets extend substantially transversely of the finished fabric, or vice versa, and each laminated web includes two or more of the thin carded sheets. The webs are secured to adjacent webs preferably solely by fibers which are forced from each web into and/or through the adjacent web or webs, usually by barbed needles.

A characteristic of a well-carded thin sheet of textile fibers is that the fibers are largely disposed substantially parallel and extend longitudinally with respect to the direction of advance of the sheet through the carding machine. Since all of the fibers in such a thin well-carded sheet may not extend necessarily in parallel relationship, the terms "carded direction" or "carded relationship" will be used herein to define the direction in which the fibers of the various carded sheets or layers of fibers predominately extend and to define the longitudinal direction in which each sheet was previously advanced through the carding machine.

The essential components of all the fabrics 10-10c are the composite laminated cores 11-11c, each of which is made up of two or more superposed laminated webs formed of groups of superposed thin carded sheets or layers of long-staple man-made textile fibers. The cores 11, 11b are made up of respective sets of three laminated webs 12, 13, 14 and 12b, 13b, 14b which will be respectively termed herein as a "core base," a "first auxiliary core web" and a "second auxiliary core web." The individual carded layers or sheets of webs 12, 13, 14 are indicated at a, b, c, respectively in FIGURES 1-4, and the individual carded layers of webs 12b, 13b, 14b are indicated at a2, b2, c2, respectively in FIGURE 9. The cores 11a, 11c of the second and fourth forms of fabric 10a, 10c differ from the first and third forms 10, 10b in that each core 11a, 11c has only two laminated webs including respective core bases 12a, 12c and auxiliary core webs 13a, 13c which are formed from respective carded sheets a', b', and a3, b3.

All the layers or sheets in each laminated core base 12, 12a, 12b, 12c extend in substantially carded relationship, and all the layers in the auxiliary core webs 13, 13a, 13b, 13c have their carded direction extending substantially transversely of the carded direction of the layers of the respective core bases 12, 12a, 12b, 12c. The second auxiliary webs 14, 14b of fabrics 10, 10b may be of the same construction as the core bases 12, 12b, since the first auxiliary core webs 13, 13b are sandwiched between the respective core bases 12, 12b, and the second auxiliary core webs 14, 14b.

Throughout the specification the terms "needlings" and "needle punches" are used to mean that fibers of adjacent carded sheets and/or composite webs are forcibly oriented or diverted to a position substantially perpendicular to the ultimate faces of the product to bind together such sheets as shown in FIGURE 9 so that a unitary and coherent product is formed. Such needlings or needle pnuches are usually effected by the barbed needles of a needle loom, which needles are provided with longitudinal rows of spaced angularly formed notches defining hooks or barbs which ensnare fibers usually during their piercing movements through the corresponding composite webs. The preferred type of needle may be such as is shown in FIGURES 2 and 2a of H. G. Lauterbach's United States Patent No. 2,958,113, issued November 1, 1960.

The number of needlings per square inch and the equivalent penetration thereof mentioned in this application are based on the use of a particular type of needle penetrating the webs to a particular extent. Therefore, whenever a particular number of needlings is mentioned, it must be construed also to mean the equivalent number of needlings and the equivalent penetration thereof when using needles of different types than have been actually used in needling webs according to the disclosures herein.

It is apparent that the greater the number of hooks on the needles which penetrate the webs, the lesser the number of needlings per square inch which would be required to unite the webs. The needles used in making the webs of this invention had a blade triangular in cross-section, which was of 30 gauge steel before triangulation thereof, with nine hooks formed in the three edges thereof, substantially as shown in said Patent No. 2,958,113, with the innermost hook on the needle being spaced approximately ⅝ of an inch from the point of the needle, and adjacent hooks on each edge were spaced about ⅛ of an inch apart. The depth of penetration of the needles was from ⅜ to ⅝ of an inch beyond the side of the webs being united opposite from the side originally pierced by the needles as measured from the first barb.

In the first form of fabric 10, the superposed layers or carded sheets a of the core base 12 are initially plied together but preferably are not united until the auxiliary core webs 13, 14 are positioned against each other and against one face of the core base 12. In some instances however, the layers a of the core base 12 may be united, if desired, by passing the same through a needle loom and sparsely needling the layers together at approximately 75 to 150 needlings per square inch.

Figure 3:
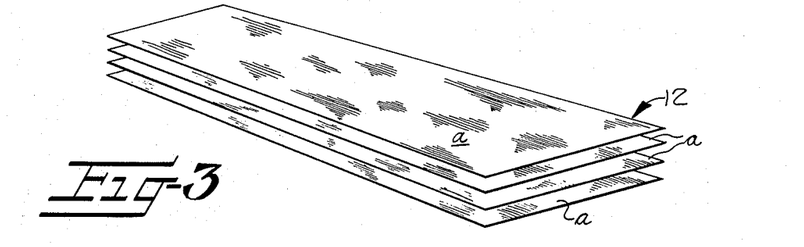
FIGURE 3 is an exploded perspective view of a group of carded sheets of long fibers arranged in superposed parallel relationship for forming the base of the core of the fabric.
Figure 4:
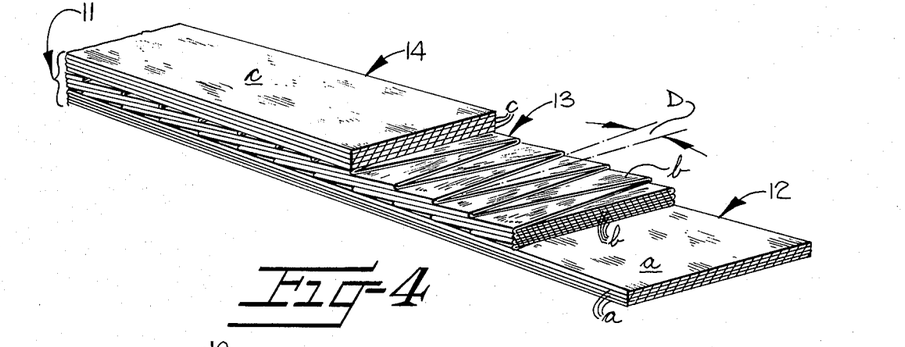
FIGURE 4 is a fragmentary, schematic perspective view of the completely assembled core of the fabric of FIGURE 1 with portions broken away.

After the core base 12 has been formed by positioning two or more sheets a of long fibers in contiguous superposed and substantially parallel relationship as shown in FIGURE 3, the first auxiliary core web 13 is formed and positioned substantially transversely of or within 17° of right-angular relationship to, and against, one face of the core base 12. The most expedient known method of forming the first auxiliary core web 13 is by cross-laying a carded sheet in the form of overlapping folds onto the core base 12 by means of a lapper of a type such as is shown in FIGURES 1-4 of C. J. Nelson's United States Patent No. 2,927,350, issued March 8, 1960, for example.

Figure 6:
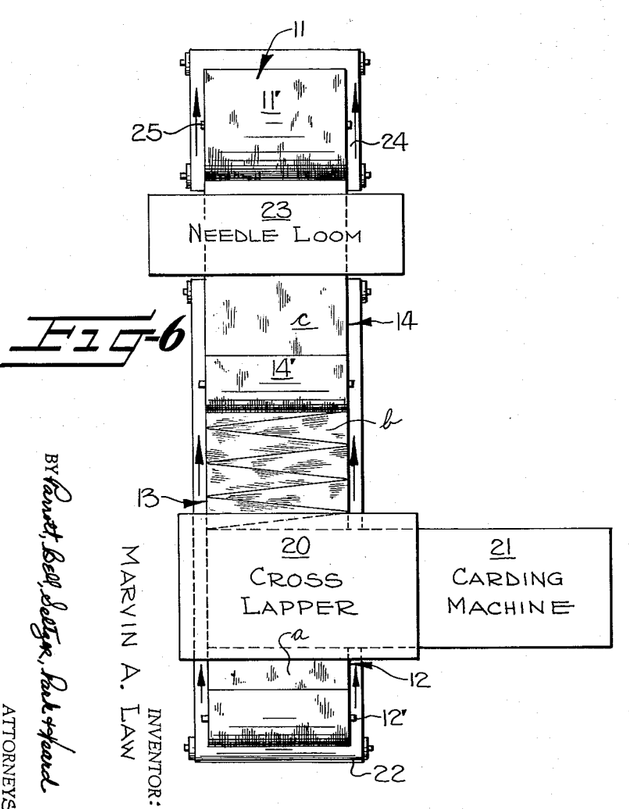
FIGURE 6 is a schematic plan view showing a preferred arrangement of a roller carding machine, a crosslapper, a needle-punching loom and related aprons or conveyors for arranging and uniting the various composite webs of the fabric core of FIGURE 1.

In FIGURE 6, a lapper 20 is shown schematically for receiving a sheet of fibers from a roller carding machine 21 and cross-lapping or shingling the sheet onto the core base 12. The core base 12 is drawn from a roll 12' onto an apron or conveyor 22 moving transversely of and beneath the lapper 20 so the sheets b are cross-laid upon the core base 12.

In forming the core 11, it is important that the included angle between adjacent layers b deposited upon the core base 12 is held within 34°, resulting in the sheets b of the first auxiliary core web 13 being positioned within a divergence angle D (FIGURE 4) of 17° with respect to right-angular relation to the core base 12. In other words, most of the fibers in the layers b forming the first auxiliary core web 13 should be within 17° of right-angular relation to most of the fibers in the layers a forming core base 12. Otherwise, the resultant product might be stretched, sprung or distorted too easily so that it would not have the required stability for use as the core of a blanket material. Actually, the aforementioned divergence angle is dependent upon (a) the width of the core base 12, (b) the width of the sheet of fibers coming from the carding machine and (c) the number of layers b which are to form the first auxiliary core web 13. The following chart illustrates the divergence angle D (FIGURE 4) of each cross-layer of a carded sheet 56 inches wide, when formed into selected numbers of layers on core bases of different widths. Each divergence angle is given with respect to lines extending at right angles to or normal to the longitudinal axis of the core base.

| Core Base Width | "D" 4 Layers | "D" 6 Layers | "D" 8 Layers | "D" 10 Layers | "D" 12 Layers | "D" 14 Layers |
|---|---|---|---|---|---|---|
| 66″ | 12.0° | 8.0° | 6.1° | 5.0° | 4.0° | 3.4° |
| 72″ | 11.0° | 7.5° | 5.7° | 4.5° | 3.8° | 3.1° |
| 80″ | 10.0° | 6.8° | 5.0° | 4.0° | 3.3° | 3.0° |
| 90″ | 9.0° | 6.0° | 4.5° | 3.6° | 3.0° | 2.7° |

The above chart points up the fact that the more cross-layers formed of a carded sheet of a given width against a core base 12 of given width, the more acute will be the divergence angle D (FIGURE 4) of the cross-layers with respect to lines normal to the longitudinal axis of the base. Since many conventional roller carding machines form a fibrous sheet 56 inches wide, it is apparent that the first auxiliary core 13 should preferably include a minimum of four layers so the fibers in the cross-laid sheets b will extend as nearly as practicable in right-angular relation to the fibers in the warpwise core sheets a.

If only two layers of fibers are to be cross-laid to form the first auxiliary web 13 on a core base 12 which is 90 inches wide, for example, in order to stay within the prescribed divergence angle of 17°, the width of the cross-layers should not exceed about 52⅝ inches, which is below the aforementioned 56 inches. It should be noted that, the narrower the carded sheet of which the cross-layers are formed, the wider the core base 12, the more acute will be the divergence angle D.

After the first auxiliary core web 13 has been cross-laid upon the core base 12, the second auxiliary core web 14 is arranged upon the core web 13 so its fibers extend substantially parallel with the fibers in the core base 12. The cross-laid core web 13 is thus sandwiched between the core webs 12, 14. Preferably, the three core webs 12, 13, 14 are stacked successively in their course to the needle-punching loom designated by the numeral 23 in FIGURE 6. Thus, the sheets c are plied together and rolled up to form a roll 14' which is positioned upon the cross-laid core web 13 and base web 12 supported by apron 22. The second auxiliary core web 14 is thus drawn from its roll 14' as all three core webs 12, 13, 14 are directed through the needle-punching loom 23 onto an apron 24 which directs the completed core 11 to a suitably driven take-up roll 25 which forms the core 11 into a core roll 11'.

The stacked core webs 12, 13, 14 forming the core 11 are united by passing the core 11 through the needle loom 23 two or more times and turning over the core after each pass through the needle loom so the core 11 is needled through from both faces thereof. The total number of needle punches or needlings formed in the core 11 should be from 200 to 750 per square inch depending upon the length of the fibers therein and the number of needlings to which the core 11 may be subjected when face webs are subsequently applied thereto. The average staple length of the fibers in core 11 should be within a range of 2½ inches to 6 inches and of 3 to 8 denier. The most favorable results have been obtained by forming the carded sheets of core 11 from 4½ inch rayon or acrylic fibers.

Fibers longer than 6 inches could be used in the core, but fibers over 6 inches long tend to hook back upon themselves during the roller carding process and, thus, the required parallelism of the fibers might not be obtained. On the other hand, fibers shorter than 2½ inches should not be used for forming the carded sheets *a*, *b*, *c* in the core 11 because the shorter the fibers, the more needlings would be required per given area of the core in order to obtain the required strength and stability thereof. The increased needlings which would be required for uniting the core webs 12, 13, 14, if they were made from fibers under 2½ inches average staple length, then would make the fabric 10 too boardy for use as a blanket material.

Fibers in the range of 3 to 8 denier are used because it is difficult to efficiently card long fibers smaller than 3 denier, and if the carded sheets are made of fibers larger than 8 denier, insufficient fibers are engaged by the needles to insure that they are effectively interlocked during the needling operations.

Depending upon the desired type and quality of the product, the fibers of which the carded sheets are formed for making the core 11 may be of any type in the group known as synthetic, protein and cellulosic, such as acetate (rayon), acrylic (Acrilan), viscose, vinyl, polyamide (nylon), or polyester (Dacron) fibers or blends thereof, but excluding mineral fibers. The core 11 could be made from cotton fibers if it were not for the fact that cotton fibers are not readily available or are prohibitively expensive in the required lengths. In preparing the core for blankets, acrylic and rayon fibers have achieved the most favorable results.

As heretofore stated, the carded sheets of long-staple fibers forming core 11 are very thin. Thin carded sheets are required basically for two reasons. First, the carded sheets must be thin enough so the card clothing on the carding machine cylinder and associated carding elements will be effective in parallelizing as many of the fibers in each sheet as is practicable to thereby provide as much strength as possible from the core webs 12, 13, 14 when they are united, with a minimum of needlings, in forming the core 11. Second, the individual carded sheets must be lightweight so that each core web 12, 13, 14 may include two or more substantially parallel carded sheets without being so thick and heavy as to become boardy when united with the other core webs and so that the complete fabric will not be too thick or heavy for use as a blanket.

The weight of the individual carded sheets may be in the range of approximately 0.20 to 1.6 ounces per square yard, depending upon the desired weight of the core 11 to be formed therefrom and the desired aggregate weight of the fabric 10. Weights of less than 0.20 ounce per square yard might be used, but the sheets are then so light that they are difficult to process; i.e., they may tear apart or rupture in their course to the take-up roll or in unwinding the rolls into which they are formed during subsequent formation of composite webs therefrom. The composite webs 12, 13, 14 or core 11 should each weigh in the range of from 1.0 to 5.0 ounces per square yard and the aggregate weight of the core 11 formed therefrom should be in the range of about 3.0 to 9.0 ounces per square yard before needling the same. After needling and pressing, the core 11 weighs slightly less than it does before needling and it is approximately 1/16 to 1/8 of an inch thick. Actual cores have had a thickness of from 0.14 to 0.20 of an inch, depending upon weight and material.

In view of the fact that each carded sheet of which the core 11 is to be formed should be as lightweight as practicable without rupturing during plying thereof with other carded sheets, and in view of the fact that the cost of production of the fabric 10 increases with increases in the number of layers or sheets employed in making up each laminated core web 12, 13, 14, it is desirable to form each such carded sheet so its weight is approximately 0.35 to .55 ounce per square yard.

From the foregoing description, it is to be noted that the layers forming the core 11 are coherently united by diverting fibers thereof substantially perpendicularly through the layers with the diverted fibers by virtue of their length permitting the avoidance of undesirable boardiness while providing the requisite coherent uniting of the layers, and whereby the high parallelization and length of the fibers in the sheets, the layer arrangement of the sheets and the diverted fibers impart the desired lengthwise and widthwise dimensional stability and strength to the core.

After the core 11 has been formed in the manner described heretofore, various types of face webs may be applied to either or both faces of core 11 and united therewith by needling. In preparing the first embodiment of the core for making a blanket material therefrom to be napped on both faces thereof, front and back laminated face webs 15, 16, each being made up of two or more layers or sheets of relatively short-staple or nappable textile fibers of from ¾-inch to 2¼-inch average staple length, are applied to front and back faces of core 11. The layers in face webs 15, 16 are indicated at *d*, *e*, respectively, in FIGURES 1 and 5. Each such layer *d*, *e* should weigh about 0.25 to 0.65 ounce per square yard.

Although all the short-staple fibers are preferably very nearly of the same length, some of the individual fibers may be up to three inches long provided that the average staple length of all the fibers is within the range of from ¾ to 2¼ inches. Practically any kind of nappable short-staple fibers may be employed in making the carded sheets or layers for the face webs 15, 16, such as cotton, rayon, acrylic, etc. Rayon short-staple fibers are preferred from the standpoint of economy. The better quality blankets would usually have the face webs formed from carded sheets of acrylic fibers.

All the carded layers in each face web 15, 16 extend in substantially the same carded direction relative to each other, and when applied to opposed faces of the core 11, the carded direction of the sheets in each face web 15, 16 preferably should be substantially transverse of the carded direction of the sheets in the adjacent outer webs of the core 11 even though the fibers are randomly oriented in sheets *d*, *e*. In other words, the front and back face webs 15, 16 are cross-laid against the second auxiliary core web 14 and the core base web 12, respectively, of core 11. A conventional cross-lapper of the type shown in said Patent No. 2,927,350 may be used for forming and positioning the face webs 15, 16 transversely of the core 11.

After each composite face web is laid against the corresponding face of core 11, the fabric 10 is needled through from each side at least once. The number of needlings per square inch effected with each pass of the core 11, with each face web applied thereto, through the needle loom should result in from 200 to 900 needlings per square inch being formed through all the webs in the fabric 10 which, when combined with the needlings previously formed in making the core 11, should result in from 400 to 1650 total needlings per square inch in the fabric 10. Best results have been obtained with a total of approximately 900 needlings per square inch in the fabric 10 with approximately half of the needlings being formed in the core 11 before face webs 15, 16 were applied thereto.

Figure 7:
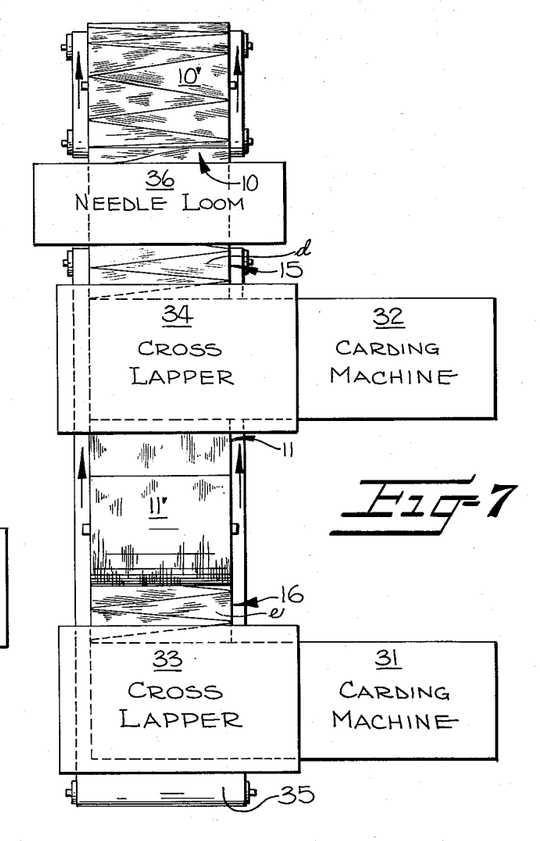
FIGURE 7 is a view similar to FIGURE 6 showing a preferred arrangement of carding machines, lappers, and aprons and a needle-punching loom for assembling the face webs with the core and uniting the same into a coherent structure forming the fabric of FIGURE 1.

FIGURE 7 shows a convenient arrangement of machinery for assembling the core 11 with the front and back face webs 15, 16 while cross-laying or cross-lapping the face webs 15, 16. In this instance, two carding machines 31, 32 and respective cross-lappers 33, 34 are arranged in spaced substantially parallel and successive relationship with respect to a feed apron or conveyor 35 over which the cross-lappers 33, 34 extend.

Although some of the nappable fibers in the sheets coming from the carding machines 31, 32 are necessarily oriented in the general direction in which the corresponding sheets are advanced through the carding machines 31, 32, the fibers in the face webs are preferably arranged as randomly as practicable so they will be more susceptible to the subsequent napping process, since the nature of the face webs 15, 16 is not relied upon for strengthening or lending stability to the fabric. The face webs may extend in the same direction as the outer webs 12, 14 of the core 11, but this is undesirable from a standpoint of production economy. It is apparent that it is much more economical to form the face webs 15, 16 by cross-lapping as opposed to rolling up the desired number of sheets into separate rolls and then unrolling them, plying them and then rolling them up into a common roll to form each face web before applying the same to the core 11. It would be difficult to roll up and then unroll the carded sheets in the forming of the face webs 15, 16 due to the random orientation of the fibers and the relatively short length of the fibers in the face webs 15, 16.

Referring again to FIGURE 7, it will be observed that the bottom or back face web 16 may be formed by cross-lapping the sheet coming from the first carding machine 31 directly onto the apron 35 as the apron advances the sheet at a speed relative to the carding machine 31 such that the required number of layers are formed in contiguous superposed relationship on the apron 35 to form the bottom or back face web 16.

The back face web 16 thus formed is advanced on the apron 35 beneath the previously formed core roll 11' positioned between the two cross-lappers 33, 34 so the back face web 16 with the core 11 thereon passes beneath the second cross-lapper 34 and the second cross-lapper then cross-lays the front face web 15 upon the core 11 in substantially the same manner in which the back face web 16 was cross-lapped upon the apron 35. The completely assembled fabric 10 thus formed is then advanced upon conveyor 35 to and through a needle-punching loom 36 which punches the desired number of needles through the fabric 10.

The fabric 10 then is advanced from the needle-punching loom 36 to a suitable take-up roll 37 where it is formed into a fabric roll 10'. Thereafter, the fabric 10 is turned over and again passed through the needle-punching loom 36 at least once more so that both sides of the fabric 10 are subjected to the needle-punching operation.

From a standpoint of economy of production, it would be desirable to pass the fabric 10 through the needle-punching loom 36 two times. However, the stability and strength of the fabric and the coherence of adjacent webs 12–16 is more effectively achieved by passing the fabric 10 through the needle-punching loom 36 from four to six times and turning over the fabric 10 each time it is passed through the needle-punching loom 36. This insures that fibers are forcibly oriented from each face web 15, 16 toward the opposite face web two or three times.

The number of needles in the needle loom 23 or 36 and the linear speed of the core or the complete fabric relative to the strokes of the corresponding needles should be such that the core 11 does not have to be passed through needle-punching loom 23 more than six times and so the complete fabric 10 does not have to be passed through the needle-punching loom 36 more than six times to effect the desired aggregate number of needlings in the fabric 10, since the greater the number of times the fabric and core are passed through the needle-punching looms, the greater the possibility that the fabric 10 will become objectionably stiff or boardy.

In its passage through the needle-punching loom 36, the fabric 10 is elongated or stretched and correspondingly reduced or shrunk in width. Accordingly, after the webs 12–16 of the fabric 10 have been united in the manner heretofore described, the fabric 10 preferably is framed or stretched laterally, such as by means of passing the same through a conventional tenter frame while over-feeding the fabric 10, so as to return the fabric to substantially its original width before it is passed through a napping machine.

For example, in a blanket fabric whose original core 11 was 90 inches wide, the width of the fabric 10 finally formed therefrom, after needling, was approximately 84 inches, and the fabric 10 was then stretched to a width of 92 inches, this being the usual length of high quality blankets. During the framing of a fabric 10 made from synthetic fibers, such as acrylic fibers, it was found desirable to preheat the fabric 10 to a temperature of from 200° to 250° F. so the fibers would be more ductile and would readily respond to the framing operation.

However, the fabric 10 must not be heated to such extent that the synthetic fibers melt and stick together upon subsequent cooling thereof to such a degree as to cause undesired stiffening of the fabric 10. Acrylic and nylon fibers, for example, do not start to stick together until they have been heated to temperatures in excess of 400° F. Rayon and similar fibers forming the fabric 10 are softened and made ductile to facilitate the framing or stretching of the fabric 10 made therefrom by simply wetting the fabric with water immediately prior to framing the fabric. The framing or stretching of the fabric 10, after the final needling thereof and before napping the same, is optional and is not necessary to the production of good blankets therefrom.

After the fabric 10 has been formed in the manner theretofore described, assuming there is a face web applied to both sides of the core thereof, both sides of the fabric 10 are napped by subjecting each side thereof to a napping operation in a conventional napping machine thereby to raise the majority of the fibers in the face webs 15, 16 with respect to the core 11 without disturbing the long fibers in the core. Since a shrinking or reduction in the width of the fabric is generally effected during the napping operation, it is preferable that the napped fabric is then framed again, as is the usual procedure in the manufacture of woven blankets, in order to return the fabric to its original desired width.

The napped fabric 10 is then cut into lengths equal to the desired width of blankets to be formed therefrom. It is unnecessary to form a selvage on the edges of the blankets thus formed due to the coherent nature of the fabric. Since any previously cross-lapped layers $b$ in the core had their fibers mostly within 17° of right-angular relation to the length of the fabric, when the fabric is cut subsequently into lengths equal to the desired width of the blankets, it is apparent that most of the fibers as originally cross-lapped would extend within 17° of parallel relation to the length of the blankets or cut lengths of fabric. Thus, as originally assembled, it can be stated that most of the fibers in layers $a, c$ extend within 17° of parallel relation to the length of the core, and most of the fibers in the layers $b$ extend within 17° of right-angular relation to most of the fibers in the layers $a, c$. If desired, the napped surfaces of the fabric may be sprayed with a suitable chemical, to cause the napped fibers to adhere to each other at contact points as is customary in the manufacture of some napped woven blankets, to prevent rearrangement of the napped fibers in laundering.

SECOND FORM OF NON-WOVEN FABRIC

Figure 1:
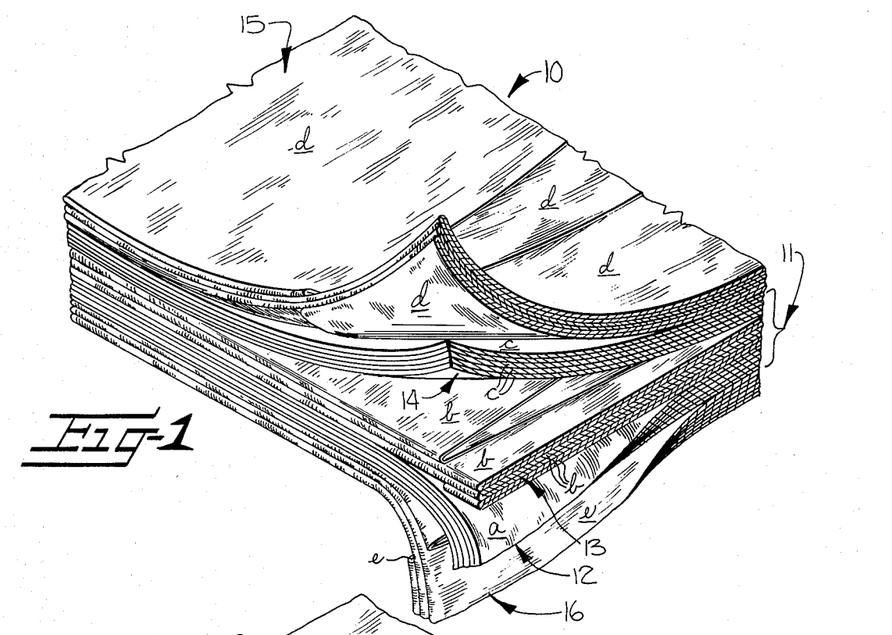
FIGURE 1 is a fragmentary perspective view of one form of the non-woven fabric of the present invention in which the thicknesses of the various carded sheets are exaggerated and webs formed therefrom are partially separated for purposes of clarity.
Figure 2:
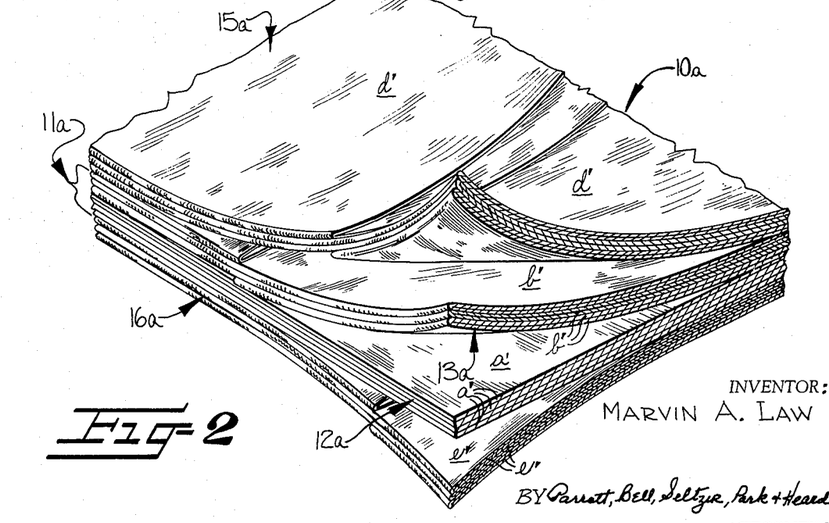
FIGURE 2 is a perspective view similar to FIGURE 1 showing a second form of the non-woven fabric of the present invention.

The second form of non-woven fabric 10a shown in FIGURE 2 is quite similar to the first form of fabric 10 shown in FIGURE 1 with the exception that the core 11a is formed of the two composite core webs 12a, 13a, instead of three. The core base 12a extends longitudinally or warpwise of the fabric and the auxiliary core web 13 is shingled or cross-laid upon core base 12a so the carded direction of the long fibers in the sheets $b'$ of the auxiliary core web 13a extend in substantially right-angular relation with respect to the fibers in the sheets $a'$ of the core base 12a.

The sheets $a', b'$ in the core webs 12a, 13a are formed of highly parallelized long fibers within the same ranges of lengths and sizes as set forth with respect to the core 11 of the fabric 10, and the sheets a', b' are also within the same ranges of weights as the sheets a, b of the core webs 12, 13 of the fabric 10. The core webs 12a, 13a of the core 11a are also assembled and united in substantially the same manner as that described for the core 11 of fabric 10 and the aggregate weight of core 11a should be within the range of the aggregate weights heretofore specified for the three webs 12, 13, 14 forming the core 11 of fabric 10.

The face webs 15a, 16a, formed of carded sheets or layers d', e', also may be constructed, cross-laid and united with core 11a in the same manner as face webs 15, 16 are constructed, cross-laid and united with core 11 of fabric 10. Although the short fiber sheets d' of the front face web 15a are cross-laid, in this instance, against the cross-laid long fiber sheets b' of web 13a, the fabric 10a is approximately as strong and stable as the fabric 10 and both of the fabrics 10, 10a may be formed into bed blankets whose different characteristics of strength and stability are barely noticeable when both types of blankets are made from the same type of fibers and are processed in the same manner. Fabric constructed in the manner of the fabric 10a may be desirable in the manufacture of very lightweight blankets, since it is apparent that the two core webs 12a, 13a of core 11a may be assembled and united at a somewhat lower cost than the three composite core webs 12, 13, 14 of fabric 10.

Figures 5, 8:
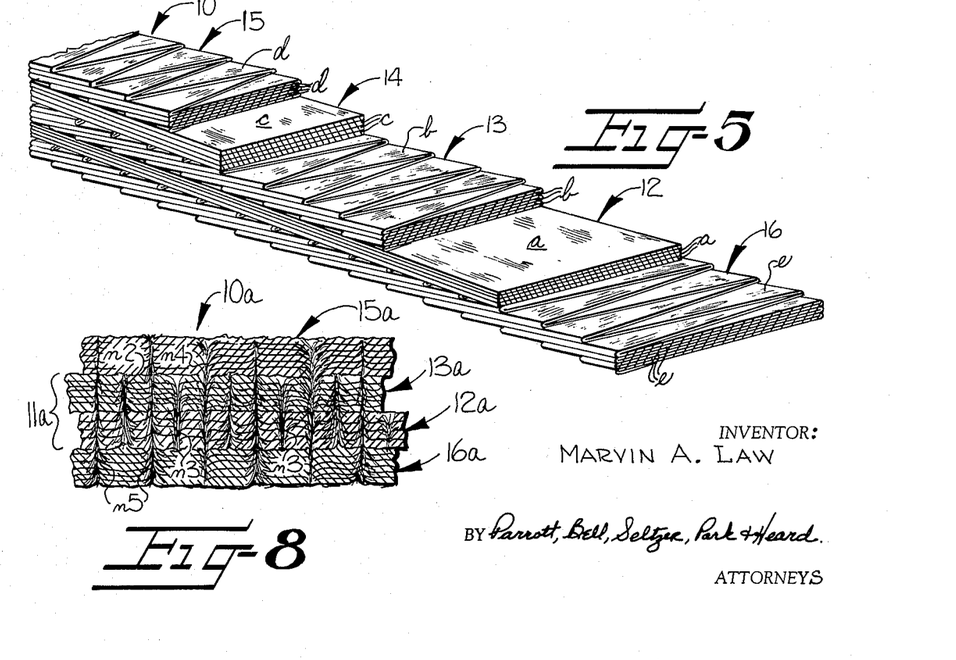
FIGURE 5 is another schematic perspective view of the fabric of FIGURE 1 with the various composite webs thereof broken away.
FIGURE 8 is a fragmentary longitudinal sectional view through the fabric of FIGURE 2 wherein the fabric is of exaggerated thickness to illustrate a few of the needlings therein.

A portion of the completed fabric 10a is shown in FIGURE 8 exaggerated in thickness to illustrate a few of the needlings. It should be noted that needlings n2 include fibers which are diverted downwardly from auxiliary core web 13a through core base web 12a and needlings n3 include fibers which divert upwardly from core base web 12a through auxiliary core web 13a. The fibers of needlings n4, n5, being relatively short, load up the barbs of the needles during the needling operation and thus divert from the respective face webs 15a, 16a and only partially through core 11a even though the needles pass through the fabric. The needlings for fabric 10 are similar to those shown in FIGURE 8.

The third and fourth forms of the fabric 10b, 10c shown in FIGURES 9 and 10 may be constructed in the manner described for the respective first and second forms of the fabric 10, 10a with the exception that the face webs 15b, 16b; 15c, 16c are in the form of loose, randomly oriented, relatively short, nappable, fibers which may be applied to opposed faces of the respective cores 11b, 11c by divers methods as, for example, by air-laying equipment. The fibers in face webs 15b, 16b, 15c, 16c may be of the lengths and types described for face webs 15, 16, 15a, 16a and may be needled to corresponding cores 11b, 11c in the manner described for needling the face webs to cores 11, 11a. Fabrics 10b, 10c then may be subjected to framing and napping processes as described heretofore.

Although the individual carded sheets of which the composite core base web 12, 12a, 12b or 12c and the corresponding composite auxiliary core webs 13, 14; 13a; 13b, 14b; or 13c are formed may weigh from 0.20 to 1.60 ounces per square yard, the number of stacked sheets and layers formed thereby, or layers formed by cross-lapping a sheet, as the case may be, in each such composite core web should be from a minimum of two to a maximum of about twenty. Therefore, the weight of the individual layers should be not only within about the specified range, but should be from 5% to 50% of 1.0 to 5.0 ounces per square yard, this being the total weight of the corresponding core base web or auxiliary core web to be formed therefrom.

Also, since the core 11, 11a, 11b, or 11c formed from the corresponding composite webs 12, 13, 14; 13a, 12a; 12b, 13b, 14b; or 12c, 13c may weigh about 3 to 9 ounces per square yard, the weight of the individual composite webs therein should not only be within about the specified range, but should be from 5% to 50% of the total weight of the core, depending upon the number of composite webs employed in making the core. Each core 11, 11a, 11b, 11c should weigh from about 30% to 50% of the total weight of the blanket or fabric 10, 10a, 10b, or 10c made therefrom. In other words, the weight of the short nappable fibers should comprise about 50% to 70% of the total weight of the fabric.

Although non-woven fabrics have been made heretofore in thicknesses of less than 1/8 of an inch, such thin fabrics have not had the strength and stability required of bed blankets unless they were impregnated with a bonding agent to such extent that they were too stiff or boardy to serve as a blanket material. Felt-like non-woven fabrics have also been constructed heretofore by laminating together thin, lightweight carded sheets of textile fibers in which alternate sheets were disposed with their fiber orientation directions disposed at 60° or 90° angles with respect to intervening sheets, but relatively short fibers of from 0.50 to 1.5 inch staple were used in forming such sheets so that, regardless of the number of needlings, the fabric was of insufficient strength to use as a blanket unless a bonding agent was used and in which event the fabric would be too stiff and boardy for use as a bed blanket material.

Felt-like non-woven fabrics have also been made heretofore from carded sheets formed of various types of fibers having a staple length up to 4½ inches, but such long fiber sheets were simple cross-lapped to form relatively heavy non-woven fabrics as compared to the weight of fabrics which must be used in forming bed blankets, and to my knowledge, none of the prior art types of fabrics formed of the long fiber carded sheets had adjacent sheets disposed with their fiber orientation directions disposed in substantially right-angular relationship.

In constructing the fabric of the present invention, it is important that a ligthtweight core is constructed of a plurality of carded sheets of substantially parallel long fibers with the fibers in certain of the sheets extending in substantially right-angular relation with respect to the fibers in certain others of the sheets and that the sheets in the core are united by a relatively low number of needlings sufficient to cause all the sheets in the core to firmly lock together and impart a high degree of stability and strength to the core, without relying on bonding agents or the heating of thermoplastic fibers, if such are used, to such extent that they melt, and so the core and the fabric made therefrom will have the desired hand, feel and drapability without being objectionably boardy or stiff. Further, it is important that short randomly oriented textile fibers capable of being napped are applied to at least one face of the core and firmly united to the core so the face of the fabric may be napped without raising any of the long fibers from the core while retaining drapability, strength and stability in the fabric which will compare favorably with a conventional woven blanket of comparable weight per square yard and made from yarns of similar fibers.

Examples of fabrics made according to the practice of the present invention will now be described.

Example I

This is an example of the first form of fabric 10 shown in FIGURE 1. 4½ inch, five denier, cut staple acrylic fibers are passed through a roller carding machine so that they are highly parallelized and formed into a sheet weighing approximately 0.5 ounce per square yard. A roller carding machine is used in order to insure a high degree of parallelization of the fibers. The high degree of parallelization of the fibers may be further assured by suitable auxiliary fiber parallelizing means in association with the roller carding machine, such as is disclosed in Frank Kalwaites' United States Patent No. 3,098,265, dated July 23, 1963, for example.

The carded sheet is formed into three independent sheets preferably by rolling up the desired lengths of the sheet coming from the carding machine to form three rolls. The three carded sheets form the sheets *a* and are unrolled in superposed relationship and preferably rolled into another larger roll to form the composite core base web 12 in which all the sheets *a* extend in the warpwise carded direction.

Three sheets *c*, substantially identical to the sheets *a*, are then plied together in superposed relationship and formed into the second auxiliary core web 14 which may be rolled up and formed into the roll 14' of FIGURE 6 with all the sheets *c* extending in the warpwise or longitudinal carded direction. The core base web roll 12' then may be positioned rearwardly of the cross-lapper 20 of FIGURE 6 and advanced upon the apron or conveyor 22 as a carded sheet identical to the first-mentioned carded sheet in this example is being formed by the roller carding machine 21 and cross-lapped upon the core base web 12 by the cross-lapper 20.

Assuming that the carding machine 21 forms a parallelized long fiber sheet 56 inches wide, that the core base web 12 is 90 inches wide, and the first auxiliary web 13 is to be six layers or sheets *b* in thickness, each layer *b* is oriented at an angle of approximately 6.0° with respect to lines at right angles to the orientation direction of the fibers in the core base web 12.

When the leading edge portions of the core base web 12 and the first auxiliary core web 13 have advanced forwardly of the cross-lapper 20, the roll 14' of the second auxiliary core web 14 is positioned upon and against the upper surface of the first auxiliary core web 13 so that it is plied with the webs 12, 13. The core 11 thus formed weighs 6 ounces per square yard. The apron 22 then advances the webs 12, 13, 14 to the needle-punching loom 23. The needle-punching loom 23 is equipped with about 4.6 needles per square inch of the type heretofore described and the speed of the webs relative to the strokes of the needles is such as to form about 75 needlings per square inch through the three webs 12, 13, 14 with this initial pass through the needle-punching loom 23.

Thereafter, the composite core 11 is formed into the roll 11' and the fabric is turned over and passed through the loom 23 a second time. The needling of the core 11 is effected four more times and the core 11 is turned over prior to each passage thereof through the needle loom 23, thus forming a total of approximately 450 needlings per square inch in the core 11. Alternatively, the core may be advanced through the needle-punching loom 23 in smaller increments so as to form from 112 to 115 needlings per square inch with each pass, and the core 11 then is passed through the needle-punching loom 23 four times and is turned over prior to each passage thereof through the needle-punching loom 23 to form approximately 450 needlings per square inch in the core 11.

It should be noted that the composite core 11 thus formed has the same number of carded layers of substantially the same weight extending in the longitudinal direction as it has cross-layers. This is desirable in order that the core will have substantially the same breaking strength in both the longitudinal and transverse directions. The stability of the core is also improved when the number and weight of the cross-layers is substantially the same as the longitudinal layers.

After the core 11 is formed, face webs 15, 16 are applied to the front and back or top and bottom faces of the core 11 thus formed. The face webs are formed of fibers having less average staple length than that of the fibers in the core. In this instance, 1½ inch, five denier, acrylic fibers are formed into sheets and are randomly arranged to all practicable extent. Therefore, the carding machines 31, 32 should be devoid of any effective special fiber parallelizing attachments.

Each of the carded sheets used in forming face webs 15, 16 weighs approximately 0.5 ounce per square yard and six cross-layers *d*, *e* are plied in forming the face webs 15, 16 and applying the same to the opposed faces of the core 11. Thus, the layers or sheets *d*, *e* in the face webs 15, 16 will be oriented at an angle of approximately 6.0° with respect to lines perpendicular to the core webs 12, 14 and the aggregate weight of the composite fabric 10 will be approximately 12 ounces per square yard.

The needle-punching loom 36 is equipped with the same number of needles per square inch as the needle loom 23 was during the needling of the core 11, and the fabric 10 is passed through the needle-punching loom 36 the same number of times and at the same lineal speed as the core 11 was passed through the needle-punching loom 23, with the fabric 10 being turned over prior to each passage through the corresponding needle-punching loom. Thus, the face webs 15, 16 are united with the core 11 by approximately 450 needlings per square inch and the total number of needlings formed in the fabric 10, including the needlings formed in the core only and the needlings subsequently formed in the face webs, is approximately 900 per square inch.

In practice, it has been found that only a relatively small amount of fibers are diverted laterally in the core 11 during the needling of the face webs 15, 16 to the core 11 (see FIGURE 8) due to the fact that the notches in the punching needles become loaded relatively quickly with the relatively small fibers ensnared thereby as they pass through the face webs 15, 16 so the needlings which are to be relied upon for assisting in maintaining stability and strength in the fabric are largely those needlings which are effected during the passages of the bare core 11 through the needle loom.

During the needling of the core 11 and the fabric 10 made therefrom, the width of the fabric decreased to approximately 84 inches due to elongation of the fabric and effective shortening and deformation of the transverse fibers in core 11. Therefore, the fabric 10 was framed or stretched laterally upon a tenter frame in the manner heretofore described to increase the width of the fabric 10 to approximately 92 inches. In so doing, it has been found that the lateral stretching of the non-woven web has a drafting effect on adjacent fibers therein and tends to straighten out some of the fibers in the cross-layers of the fabric so that, although some of the fibers in the warpwise layers may tend to separate during the framing of the fabric 10, there is no noticeable loss in the strength or stability of the fabric.

The fabric 10 was then passed through a conventional napping machine from two to six times, as is usual in the napping of woven blanket material, to nap the faces of the fabric to a depth substantially equal to the thickness of the face webs 15, 16. This resulted in a very lofty napped surface on each side of the fabric 10 so that there was a substantially greater loft to the non-woven fabric of the invention than is obtained from woven fabric of comparable strength, drapability, stability and weight per square yard. As is customary, since some shrinkage in the width of the fabric occurs during the napping operation, the fabric 10 again may be framed or stretched laterally after napping the same.

*Example II*

A fabric was made in the same manner as the fabric of Example I with the exception that all the fibers therein were rayon fibers of the same length and denier as the fibers used in making the fabric of Example I.

*Example III*

This is an example of the fabric 10*a* of FIGURE 2. The core 11*a* of this fabric was made from 4½ inch cut staple, five denier, acrylic fibers. Four carded sheets of substantially parallel 4½ inch fibers and weighing 0.4 ounce per square yard were arranged in parallel warpwise superposed relationship to form the sheets *a'* and the core base 12*a*. Thereafter, eight sheets of 4½ inch parallelized fibers weighing approximately 0.4 ounce per square yard were formed into the auxiliary core web 13a by a cross-lapper to form the sheets b' and auxiliary web 13a, thus forming the core 11a.

Assuming the core base web 12a to be 90 inches wide and that the eight layers b' were formed of a carded sheet 56 inches wide, the layers or sheets b' in the auxiliary core web 13a were then oriented at an angle of approximately 4.5° with respect to lines perpendicular to the core base web 12a. Thus, the core 11a then weighed approximately 4.8 ounces per square yard. The core 11a was then passed through a needle-punching loom the same number of times and at the same speed as that specified in Example I and with the loom being equipped with the same number of needles per square inch so that the aggregate needlings in the core 11a amounted to 450 per square inch.

Face webs 15a, 16a, formed from carded sheets of from ¾ to 2¼ inch staple acrylic fibers were then cross-laid against opposite faces of the core 11a. Each of the sheets weighed approximately 0.8 ounce per square yard and was formed into four sheets or layers so that the sheets d' and e' in the face webs 15a, 16a were oriented at an angle of approximately 12.0° with respect to lines extending at right angles to the longitudinal axis of the fabric 10a. Thus, each face web 15a, 16a weighed approximately 3.2 ounces per square yard and the aggregate weight of the fabric 10a, before needling, was approximately 11.2 ounces per square yard. Thereafter, the fabric 10a was needled, stretched laterally and napped in the same manner as described in Example I.

When the fabric of Example III was prepared for napping at opposed sides thereof, it weighed approximately 11.2 ounces per square yard and it weighed approximately 10 ounces per square yard after being napped on both sides although the napping operations elongated the fabric from eight to nine percent per unit length as compared to its length prior to napping. The dead loss of fibers resulting from the napping operation was approximately 4 percent; i.e., a given length of fabric had about 4 percent less fibers therein following the napping of the blanket as compared to the amount of fibers therein prior to napping. This dead loss is less than the dead loss usually encountered in the napping of woven blankets made from the same type of fibers and being of comparable weight per square yard.

*Examples IV and V*

Fabrics were made in substantially the same manner as the fabrics of Examples I and III with the exception that the cores 11, 11a were made from rayon fibers. However, acrylic fibers still were used in making the face webs 15, 15a, 16, 16a for the fabrics of these Examples IV and V.

Other exemplary fabrics correspond to the foregoing Examples I–V with the face webs being applied in the manner of face webs 15b, 16b, 15c, 16c of FIGURES 9 and 10.

The following chart illustrates other examples of carded sheet constructions and corresponding fabric cores which may be produced according to the present invention and wherein:

I = the number of parallel longitudinal layers in the core base 12 with 14, or 12a,
II = the weight in ounces per square yard of each layer in the core base,
III = the total weight of the core base in ounces per square yard,
IV = the total number of cross-layers 13 or 13a applied to one or both faces of the core base,
V = the weight in ounces per square yard of the non-woven sheet used in forming the cross-layers,
VI = the total weight in ounces per square yard of the cross-layers, and
VII = the total weight of the core 11 or 11a in ounces per square yard formed from the corresponding core base and cross-layers.

OTHER NON-WOVEN CORE CONSTRUCTIONS

| Core Base | | | Cross Layers | | | |
|---|---|---|---|---|---|---|
| I | II | III | IV | V | VI | VII |
| 5 | .4 | 2.0 | 8 | .4 | 3.2 | 5.2 |
| 5 | .4 | 2.0 | 10 | .35 | 3.5 | 5.5 |
| 5 | .4 | 2.0 | 8 | .6 | 4.8 | 6.8 |
| 4 | .8 | 3.2 | 8 | .4 | 3.2 | 6.4 |
| 4 | .8 | 3.2 | 10 | .35 | 3.5 | 6.7 |
| 3 | 1.0 | 3.0 | 7 | .5 | 3.5 | 6.5 |
| 3 | 1.5 | 4.5 | 7 | .4 | 2.8 | 7.3 |
| 4 | .4 | 1.6 | 9 | .4 | 3.6 | 5.2 |
| 3 | 1.5 | 4.5 | 3 | .6 | 1.8 | 6.3 |
| 6 | .48 | 2.88 | 8 | .39 | 3.12 | 6.0 |
| 6 | .51 | 3.06 | 8 | .43 | 3.44 | 6.5 |
| 6 | .57 | 3.42 | 8 | .36 | 2.88 | 6.3 |
| 6 | .53 | 3.18 | 8 | .49 | 3.92 | 7.1 |
| 6 | .53 | 3.18 | 6 | .42 | 2.52 | 5.7 |
| 6 | .38 | 2.28 | 6 | .42 | 2.52 | 4.8 |
| 6 | .46 | 2.76 | 8 | .43 | 3.44 | 6.2 |
| 6 | .33 | 1.98 | 6 | .405 | 2.43 | 4.41 |
| 6 | .295 | 1.77 | 6 | .475 | 2.85 | 4.62 |
| 6 | .33 | 1.98 | 6 | .455 | 2.73 | 4.71 |
| 6 | .525 | 3.15 | 6 | .595 | 3.57 | 6.72 |

It is apparent that the core 11 of FIGURE 1 may be arranged with the fibers of composite web 13 extending longitudinally and with the composite webs 12, 14 being cross-laid, if desired. However, in either arrangement, the total number of cross-layers in the core 11 should preferably be about equal to the total number of longitudinal layers in the core.

The above chart does not include cross-layers of face webs such as are indicated at 15, 16, 15a, 16a in FIGURES 1 and 2 or face webs in the form of matts of loose, randomly oriented fibers such as are shown in FIGURES 9 and 10, since the number of layers, or the amount of fibers, and the weight thereof used in forming such face webs is largely determined by the desired ultimate weight of the blanket or other fabric to be formed from the various cores appearing in the above chart. The cores appearing in the above chart may be processed and needled in the manner described in the foregoing detailed examples.

The breaking strength of non-woven fabrics constructed in accordance with the present invention compares favorably with and is actually greater than that of woven blanket fabrics of comparable weight, stability, softness and pliability. For example, a non-woven blanket made entirely of acrylic fibers according to the foregoing examples and having a core weighing approximately 5.5 ounces per square yard was positioned in gripping jaws of a conventional Scott tester. The jaws of the Scott tester were one inch wide and were spaced three inches apart with respect to the direction in which they applied tensile force to the fabric.

The non-woven fabric was then subjected to a stretching force by the jaws and it parted when the tensile force applied to the fabric reached approximately 55 pounds with respect to the longitudinal edges of the fabric. The fabric was also tested in a similar manner with the tensile force being applied transversely thereof and the fabric was parted when subjected to a tensile force of 55 pounds.

A similar non-woven blanket whose core weighed approximately 4 ounces per square yard was also tested in the same manner as the fabric whose core weighed 5.5 ounces per square yard and was found to have a breaking strength of approximately 38 pounds in each the longitudinal and transverse direction. The accepted standard of the Americal Hotel Association for the minimum breaking strength for woven blankets is approximately 30 pounds in the longitudinal or warpwise direction and 25 pounds in the transverse or fillingwise direction.

By way of comparison, a conventionally woven blanket made entirely of acrylic fibers and weighing approximately the same amount per square yard as the non-woven blankets which were subjected to the above tests on the Scott tester was subjected to similar tests and was found to have a breaking strength of about 45 pounds in the warpwise direction and about 27 pounds in the fillingwise direction. It can thus be seen that non-woven blankets made according to the present invention are actually stronger than woven blankets of comparable weight made from substantially the same types of fibers.

In carrying out the aforementioned tests on the Scott tester, it was found that the woven blanket would break abruptly along lines perpendicular to the direction in which the tensile or pulling force was applied. On the other hand, the non-woven blanket of the present invention does not break abruptly and has considerable elongation at the break. This indicates that a non-woven blanket constructed according to the present invention may be subjected to considerably more shock before it would actually become parted than would be the case with a woven blanket of the same strength as the non-woven blanket.

An important advantage of the present invention over conventionally woven blankets is that, once cores 11, 11a, 11b, or 11c have been manufactured which have the desired breaking strength and stability in the longitudinal and transverse directions, various weights of face webs 15, 16; 15a, 16a; 15b, 16b or 15c, 16c may be applied to different cores to obtain blankets of various weights. On the other hand, in order to obtain woven blankets of different weights, the fabric must be woven from different sizes of yarns, particularly filling yarns. The size of the yarns and/or the density of the weave must be increased to increase the breaking strength of a woven blanket, but the breaking strength of the non-woven blanket of the present invention may be increased simply by increasing the number of layers in forming each composite web of the core.

The present non-woven blanket is more impervious to air currents passing therethrough than comparable woven blankets, thus being a better heat insulator than a comparable woven blanket. Also, non-woven blankets produced according to this invention may be manufactured at substantially lesser cost than comparable woven blankets due, primarily, to the apparent savings in labor.

In the drawings and specification there have been set forth preferred embodiments of the invention and, although specific terms are employed, they are used in a generic and descriptive sense only and not for purposes of limitation, the scope of the invention being defined in the claims.

I claim:
1. A method of making a non-woven core characterized by having lengthwise and widthwise dimensional stability and strength while having desired drapability and thereby being adaptable for use in making a non-woven blanket fabric, said method comprising
  (a) forming sheets of highly parallelized textile fibers having an average staple length of at least about 2½ inches,
  (b) arranging a plurality of said sheets in contiguous superposed layers to form a composite core with most of the fibers in certain of the layers thereof extending within 17° of parallel relation to the length of the core being formed and also extending within 17° of right-angular relation to most of the fibers in certain other of the layers, and
  (c) coherently uniting the layers of the composite core by diverting fibers thereof substantially perpendicularly through the layers with the diverted fibers by virtue of their length permitting the avoidance of undesirable boardiness while providing the requisite coherent uniting of the layers, and whereby the high parallelization and length of the fibers in the sheets, the layer arrangement of the sheets and the diverted fibers impart the desired lengthwise and widthwise dimensional stability and strength to the core.

2. A non-woven core made according to the method of claim 1.

3. A method according to claim 1, wherein the diverting of the fibers is effected by needle-punching within the range of 200 to 750 needlings per square inch.

4. A method of making a non-woven core characterized by having lengthwise and widthwise dimensional stability and strength while having desired drapability and thereby being adaptable for use in making a non-woven blanket fabric, said method comprising
  (a) forming carded sheets of highly parallelized textile fibers having an average staple length of at least about 2½ inches with each sheet weighing in the range of 0.20 to 1.60 ounces per square yard,
  (b) arranging a plurality of said sheets in contiguous superposed layers to form a composite core with most of the fibers in certain of the layers thereof extending within 17° of parallel relation to the length of the core being formed and also extending within 17° of right-angular relation to most of the fibers in certain other of the layers, and
  (c) coherently uniting the layers of the composite core by diverting fibers thereof substantially perpendicularly through the layers with the diverted fibers by virtue of their length permitting the avoidance of undesirable boardiness while providing the requisite coherent uniting of the layers, and whereby the high parallelization and length of the fibers in the sheets, the layer arrangement of the sheets and the diverted fibers impart the desired lengthwise and widthwise dimensional stability and strength to the core.

5. A non-woven core made according to the method of claim 4.

6. A method of making a non-woven core characterized by having lengthwise and widthwise dimensional stability and strength while having desired drapability and thereby being adaptable for use in making a non-woven blanket, said method comprising
  (a) forming a base web of highly parallelized textile fibers having an average staple length of at least about 2½ inches with most of the fibers thereof extending substantially parallel to the length of the base web,
  (b) forming a composite core by cross-lapping a sheet of highly parallelized textile fibers in the form of a plurality of overlapping layers against one face of the base web with the layers being cross-lapped within 17° of right-angular relation to the base web, and
  (c) coherently uniting the composite core by diverting fibers thereof substantially perpendicularly through the core with the diverted fibers by virtue of their length permitting the avoidance of undesirable boardiness by providing the requisite coherent uniting of the layers and the base web thereof, and whereby the high parallelization, the length of the fibers, the arrangement of the layers with the base web, and the diverted fibers impart the desired lengthwise and widthwise dimensional stability and strength to the core.

7. A method of making a non-woven core characterized by having lengthwise and widthwise dimensional stability and strength while having desired drapability and thereby being adaptable for use in making a non-woven blanket, said method comprising
  (a) forming a base web of highly parallelized textile fibers with most of the fibers thereof extending substantially parallel to the length of the base web,
  (b) forming a composite core by cross-lapping a sheet of highly parallelized textile fibers having an average staple length of at least about 2½ inches in the form of a plurality of overlapping layers against one face of the base web with the layers being cross-lapped within 17° of right-angular relation to the base web, and (c) coherently uniting the composite core by diverting fibers thereof substantially perpendicularly through the core with the diverted fibers by virtue of their length permitting the avoidance of undesirable boardiness by providing the requisite coherent uniting of the layers and the base web thereof, and whereby the high parallelization, the length of the fibers, the arrangement of the layers with the base web and the diverted fibers impart the desired lengthwise and widthwise dimensional stability and strength to the core.

8. A method of making a non-woven core characterized by having lengthwise and widthwise dimensional stability and strength while having desired drapability and thereby being adaptable for use in making a non-woven blanket, said method comprising (a) forming sheets of highly parallelized textile fibers having an average staple length of at least about 2½ inches, (b) arranging a plurality of said sheets in contiguous superposed layers to form a multi-layer base web with most of the fibers therein extending in substantially parallel relationship and substantially parallel to the length of the core being formed, (c) forming a composite core by cross-lapping against at least one face of the thus formed base web at least one of said first-named sheets in the form of a plurality of overlapping layers with most of the fibers in the overlapping layers extending within 17° of right-angular relation to most of the fibers in the layers of the base web, and (d) coherently uniting the composite core by diverting fibers thereof substantially perpendicularly through the layers thereof with the diverted fibers by virtue of their length permitting the avoidance of undesirable boardiness while providing the requisite coherent uniting of the layers, and whereby the high parallelization and length of the fibers in the sheets, the layer arrangement of the sheets and the diverted fibers impart the desired lengthwise and widthwise dimensional stability and strength to the core.

9. A non-woven core made according to the method of claim 8.

10. A method of making a non-woven fabric characterized by having lengthwise and widthwise dimensional stability and strength while having desired drapability and thereby being adaptable for use in making a non-woven blanket, said method comprising (a) forming first and second web-like components of highly parallelized textile fibers having an average staple length of at least about 2½ inches, (b) arranging said components in contiguous superposed relationship to form a composite core with most of the fibers in said first component extending within 17° of parallel relation to the length of the core being formed and most of the fibers in said second component extending within 17° of right-angular relation to most of the fibers in said first component, (c) coherently uniting the web-like components by diverting fibers thereof substantially perpendicularly through the same with the diverted fibers by virtue of their length permitting the avoidance of undesirable boardiness while providing the requisite coherent uniting of the components, and whereby the high parallelization and length of the fibers in the components, the arrangement of the components as defined in (b) and the diverted fibers impart the desired lengthwise and widthwise dimensional stability and strength to the core, (d) randomly arranging textile fibers against at least one face of the composite core to form a face layer component thereon, and (e) coherently uniting said face layer component with said core by diverting fibers of the face layer component substantially perpendicularly into the core without imparting undesirable boardiness to the fabric thus formed.

11. A non-woven fabric made according to the method of claim 10.

12. A method of making a non-woven fabric characterized by having lengthwise and widthwise dimensional stability and strength while having desired drapability and thereby being adaptable for use in making a non-woven blanket, said method comprising (a) forming sheets of highly parallelized textile fibers having an average staple length of at least about 2½ inches, (b) arranging a plurality of said sheets in contiguous superposed layers to form a composite core with most of the fibers in certain of the layers thereof extending within 17° of parallel relation to the length of the core being formed and also extending within 17° of right-angular relation to most of the fibers in certain other of the layers.

(c) coherently uniting the layers of the composite core by diverting fibers thereof substantially perpendicularly through the layers with the diverted fibers by virtue of their length permitting the avoidance of undesirable boardiness while providing the requisite coherent uniting of the layers, and whereby the high parallelization and length of the fibers in the sheets, the layer arrangement of the sheets, and the diverted fibers impart the desired lengthwise and widthwise dimensional stability and strength to the core and thus to the fabric being formed, (d) randomly arranging textile fibers against at least one face of said composite core to form a face layer thereon, and (e) coherently uniting said face layer with said core by diverting fibers of the face layer substantially perpendicularly into the core without imparting undesirable boardiness to the fabric thus formed.

13. The method of claim 12 including napping the face of the fabric having the face layer thereon.

14. A non-woven fabric made according to the method of claim 13.

15. The method of claim 12, wherein textile fibers are randomly arranged against each face of the composite core, and wherein the average staple length of the randomly arranged fibers is less than that of the fibers in the composite core.

16. A method of making a non-woven fabric characterized by having lengthwise and widthwise dimensional stability and strength while having desired drapability and thereby being adaptable for use in making a non-woven blanket, said method comprising (a) forming first and second web-like components of highly parallelized textile fibers having an average staple length of at least about 2½ inches, (b) forming a composite core by arranging said components in contiguous superposed relationship with most of the fibers in said first component extending within 17° of parallel relation to the length of the composite core being formed and most of the fibers in said second component extending within 17° of right-angular relation to most of the fibers in said first component, (c) coherently uniting the composite core by diverting fibers thereof substantially perpendicularly through the components by needle-punching within the range of 200 to 750 needlings per square inch, with the diverted fibers by virtue of their length permitting the avoidance of undesirable boardiness while providing the requisite coherent uniting of the components, and whereby the high parallelization and length of the fibers in the components, the arrangement of the components as defined in (b) and the diverted fibers impart the desired lengthwise and widthwise dimensional stability and strength to the core and thus to the fabric being formed, (d) randomly arranging textile fibers, having an average staple length less than that of the fibers in the composite core, against at least one face of the composite core to form a face layer thereon, and (e) coherently uniting said face layer with said composite core by diverting fibers of the face layer substantially perpendicularly into the core without imparting undesirable boardiness to the fabric thus formed.

17. A method of making a non-woven fabric characterized by having lengthwise and widthwise dimensional stability and strength while having desired drapability and thereby being adaptable for use in making a non-woven blanket, said method comprising (a) forming carded sheets of highly parallelized textile fibers having an average staple length of at least about 2½ inches with each sheet weighing in the range of 0.20 to 1.60 ounces per square yard, (b) arranging a plurality of said sheets in contiguous superposed layers to form a multi-layer base web with most of the fibers in each layer extending substantially parallel to the length of the base web being formed, (c) cross-lapping at least one of said first-named sheets in the form of a plurality of overlapping layers against one face of the thus formed base web to form a composite core with most of the fibers in the cross-lapped sheet extending within 17° of right-angular relation to most of the fibers in the layers of said base web, (d) coherently uniting the composite core by diverting fibers thereof substantially perpendicularly through the layers thereof with the diverted fibers by virtue of their length permitting the avoidance of undesirable boardiness while providing the requisite coherent uniting of the layers of the composite core, and whereby the high parallelization and length of the fibers in the core, the arrangement of the layers, and the diverted fibers impart the desired lengthwise and widthwise dimensional stability to the core and thus to the fabric being formed, (e) arranging against each face of said composite core a face layer of randomly arranged textile fibers having an average staple length less than that of the fibers in the composite core, and (f) coherently uniting said face layers with said composite core by diverting fibers of the face layers substantially perpendicularly into the composite core without imparting undesirable boardiness to the fabric thus formed.

18. A method according to claim 17, wherein the weight of the composite core, including the base web and the cross-lapped sheet, weighs about three to nine ounces per square yard.

19. A method according to claim 17, wherein the randomly arranged fibers are in sheet form before being arranged against the faces of the composite core and are arranged against the core by cross-lapping.

20. A method according to claim 17, wherein the aggregate weight of the fabric, including the composite core and the face layers, is about six to thirteen ounces per square yard.

21. A method according to claim 17, which includes repeating step (b) following step (c) and prior to step (d) to form a heavier composite core.

22. A method according to claim 17, including napping opposed faces of the fabric having the face layers thereon.

23. A non-woven fabric made according to the method of claim 14.

References Cited by the Examiner

UNITED STATES PATENTS

| | | | |
|---|---|---|---|
| 1,557,282 | 10/1925 | Henrichon | 26—32 X |
| 1,978,620 | 10/1935 | Brewster. | |
| 2,115,581 | 4/1938 | Johnson | 28—72.2 X |
| 2,315,851 | 4/1943 | Goldman | 161—58 X |
| 2,331,321 | 10/1943 | Heaton | 156—148 X |
| 2,381,184 | 8/1945 | Ripley | 28—72.2 |
| 2,434,887 | 1/1948 | Repass et al. | 161—55 X |
| 2,908,064 | 10/1959 | Lauterbach | 161—57 |
| 2,910,763 | 11/1959 | Lauterbach | 161—154 |
| 2,927,350 | 3/1960 | Nelson | 19—163 |
| 3,086,276 | 4/1963 | Bartz et al. | 28—72.2 X |
| 3,097,413 | 7/1963 | Draper | 28—72.2 X |
| 3,112,552 | 12/1963 | Smith. | |

DONALD W. PARKER, *Primary Examiner.*

L. K. RIMRODT, *Assistant Examiner.*